United States Patent
Shelef et al.

(10) Patent No.: US 12,556,386 B2
(45) Date of Patent: Feb. 17, 2026

(54) SYSTEM AND METHOD FOR SECRET ROTATION USING CONTEXTUAL MANAGEMENT OF MACHINE IDENTITIES

(71) Applicant: Oasis Security Ltd., Tel Aviv (IL)

(72) Inventors: Barak Shelef, Tel Aviv (IL); Dany Brikman, Tel Aviv (IL); Amit Zimerman, Tel Aviv (IL)

(73) Assignee: Oasis Security Ltd., Tel Aviv (IL)

( * ) Notice: Subject to any disclaimer, the term of this patent is extended or adjusted under 35 U.S.C. 154(b) by 235 days.

(21) Appl. No.: 18/412,870

(22) Filed: Jan. 15, 2024

(65) Prior Publication Data

US 2025/0007709 A1  Jan. 2, 2025

Related U.S. Application Data

(63) Continuation-in-part of application No. 18/345,696, filed on Jun. 30, 2023.

(51) Int. Cl.
| | |
|---|---|
| *H04L 21/00* | (2006.01) |
| *H04L 9/08* | (2006.01) |
| *H04L 9/32* | (2006.01) |

(52) U.S. Cl.
CPC .......... *H04L 9/0891* (2013.01); *H04L 9/0894* (2013.01); *H04L 9/3213* (2013.01)

(58) Field of Classification Search
CPC .... H04L 9/0894; H04L 9/0891; H04L 9/3213
See application file for complete search history.

(56) References Cited

U.S. PATENT DOCUMENTS

| | | | |
|---|---|---|---|
| 11,811,787 B1* | 11/2023 | Lichtenstein | ........... H04L 63/14 |
| 2006/0075503 A1 | 4/2006 | Bunker et al. | |
| 2012/0088211 A1 | 4/2012 | Massaro | |
| 2016/0020940 A1 | 1/2016 | Maltz et al. | |
| 2017/0223039 A1 | 8/2017 | Mont et al. | |
| 2019/0007443 A1 | 1/2019 | Cook et al. | |
| 2019/0362014 A1 | 11/2019 | Ikhlaq | |
| 2021/0051143 A1 | 2/2021 | Nelson et al. | |
| 2021/0064772 A1 | 3/2021 | Southerland et al. | |
| 2021/0287107 A1 | 9/2021 | Badawy et al. | |
| 2022/0086162 A1* | 3/2022 | Badawy | ................ H04L 63/105 |
| 2022/0174061 A1 | 6/2022 | Chitkara et al. | |

(Continued)

OTHER PUBLICATIONS

International Search Report for PCT/IB2024/056436, dated Sep. 26, 2024. Searching Authority, Israel Patent Office, Jerusalem, Israel.

(Continued)

*Primary Examiner* — Rodman Alexander Mahmoudi
(74) *Attorney, Agent, or Firm* — M&B IP Analysts, LLC

(57) ABSTRACT

A system and method for secret rotation. A method includes rotating a first secret by switching a second secret with the first secret; verifying cessation of use of the first secret by at least one entity based on secrets use with respect to a plurality of identity objects, wherein each identity object corresponds to an identity utilized in a computing environment; verifying use of the second secret by the at least one entity based on the secrets use with respect to the plurality of identity objects; and disabling the first secret when the cessation of use of the first secret and the use of the second secret have been verified.

15 Claims, 14 Drawing Sheets

(56) References Cited

U.S. PATENT DOCUMENTS

2023/0079608 A1* 3/2023 Chen .................... H04L 9/0891
                                                         380/277

OTHER PUBLICATIONS

Written Opinion of the Searching Authority for PCT/IB2024/056436, dated Sep. 26, 2024. Searching Authority, Israel Patent Office, Jerusalem, Israel.
"Rotate Aws Secrets Manager Secrets—AWS Secrets Manager." Amazon Web Services, docs.aws.amazon.com/secretsmanager/latest/userguide/rotating-secrets.html. Date retrieved Jan. 15, 2024.
International Search Report for PCT/IB2024/056437, dated Oct. 13, 2024. Searching Authority, Israel Patent Office, Jerusalem, Israel.
Written Opinion of the Searching Authority for PCT/IB2024/056437, dated Oct. 13, 2024. Searching Authority, Israel Patent Office, Jerusalem, Israel.

* cited by examiner

SYSTEM AND METHOD FOR SECRET ROTATION USING CONTEXTUAL MANAGEMENT OF MACHINE IDENTITIES

CROSS-REFERENCE TO RELATED APPLICATIONS

This application is a continuation-in-part of U.S. patent application Ser. No. 18/345,696 filed on Jun. 30, 2023, the contents of which are hereby incorporated by reference.

All of the applications referenced above are hereby incorporated by reference.

TECHNICAL FIELD

The present disclosure relates generally to secrets management, and more specifically to replacing secrets in computing environments with new secrets.

BACKGROUND

A secret in computing is a private piece of data that may act as a key to unlock protected resources or sensitive information. A non-human user having a secret may utilize the secret to gain permission and/or access to resources belonging to an owner of the secret. Because secrets can be used to gain permission and access, secrets are a prime target for cyber attackers looking to obtain valuable information. Consequently, protecting secrets helps to prevent cyber attacks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for secret rotation. The method comprises: rotating a first secret by switching a second secret with the first secret; verifying cessation of use of the first secret by at least one entity based on secrets use with respect to a plurality of identity objects, wherein each identity object corresponds to an identity utilized in a computing environment; verifying use of the second secret by the at least one entity based on the secrets use with respect to the plurality of identity objects; and disabling the first secret when the cessation of use of the first secret and the use of the second secret have been verified.

Certain embodiments disclosed herein also include a non-transitory computer readable medium having stored thereon causing a processing circuitry to execute a process, the process comprising: rotating a first secret by switching a second secret with the first secret; verifying cessation of use of the first secret by at least one entity based on secrets use with respect to a plurality of identity objects, wherein each identity object corresponds to an identity utilized in a computing environment; verifying use of the second secret by the at least one entity based on the secrets use with respect to the plurality of identity objects; and disabling the first secret when the cessation of use of the first secret and the use of the second secret have been verified.

Certain embodiments disclosed herein also include a system for secret rotation. The system comprises: a processing circuitry; and a memory, the memory containing instructions that, when executed by the processing circuitry, configure the system to: rotate a first secret by switching a second secret with the first secret; verify cessation of use of the first secret by at least one entity based on secrets use with respect to a plurality of identity objects, wherein each identity object corresponds to an identity utilized in a computing environment; verify use of the second secret by the at least one entity based on the secrets use with respect to the plurality of identity objects; and disable the first secret when the cessation of use of the first secret and the use of the second secret have been verified.

Certain embodiments disclosed herein include the method, non-transitory computer readable medium, or system noted above or below, further including or being configured to perform the following step or steps: analyzing a graph based on data indicating the secrets use in order to identify the first secret and the second secret in the graph, wherein the cessation of the first secret and the use of the second secret are verified based further on the identification of the first secret and the second secret in the graph.

Certain embodiments disclosed herein include the method, non-transitory computer readable medium, or system noted above or below, further including or being configured to perform the following step or steps: identifying use of the first secret by each of the at least one entity based on the identification of the first secret in the graph.

Certain embodiments disclosed herein include the method, non-transitory computer readable medium, or system noted above or below, further including or being configured to perform the following step or steps: extracting a plurality of features from data of a plurality of computing service providers, wherein each extracted feature is common to at least two of the plurality of identity objects; and assigning metadata to each of the plurality of identity objects based on the extracted features, wherein the graph includes the plurality of identity objects and assigned metadata.

Certain embodiments disclosed herein include the method, non-transitory computer readable medium, or system noted above or below, wherein each of the first secret and the second secret is attached to a respective identity object of the plurality of identity objects in the graph.

Certain embodiments disclosed herein include the method, non-transitory computer readable medium, or system noted above or below, further including or being configured to perform the following step or steps: linking the plurality of identity objects and assigned metadata to nodes representing respective owners in the graph; identifying an owner of the first secret based on the linking of the plurality of identity objects and assigned metadata to the nodes representing respective owners in the graph; and sending a notification indicating the rotation of the first secret to the identified owner of the first secret.

Certain embodiments disclosed herein include the method, non-transitory computer readable medium, or system noted above or below, further including or being configured to perform the following step or steps: sending a notification indicating the second secret to the identified owner of the first secret.

Certain embodiments disclosed herein include the method, non-transitory computer readable medium, or system noted above or below, further including or being configured to perform the following step or steps: linking at least one identity object of the plurality of identity objects to a secrets vault; and storing the second secret in the secrets vault, wherein the use of the second secret is verified based on the at least one identity object linked to the secrets vault.

Certain embodiments disclosed herein include the method, non-transitory computer readable medium, or system noted above or below, further including or being configured to perform the following step or steps: identifying the secrets vault based on the at least one identity object linked to the secrets vault, wherein the second secret is stored in the secrets vault when the secrets vault is identified.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
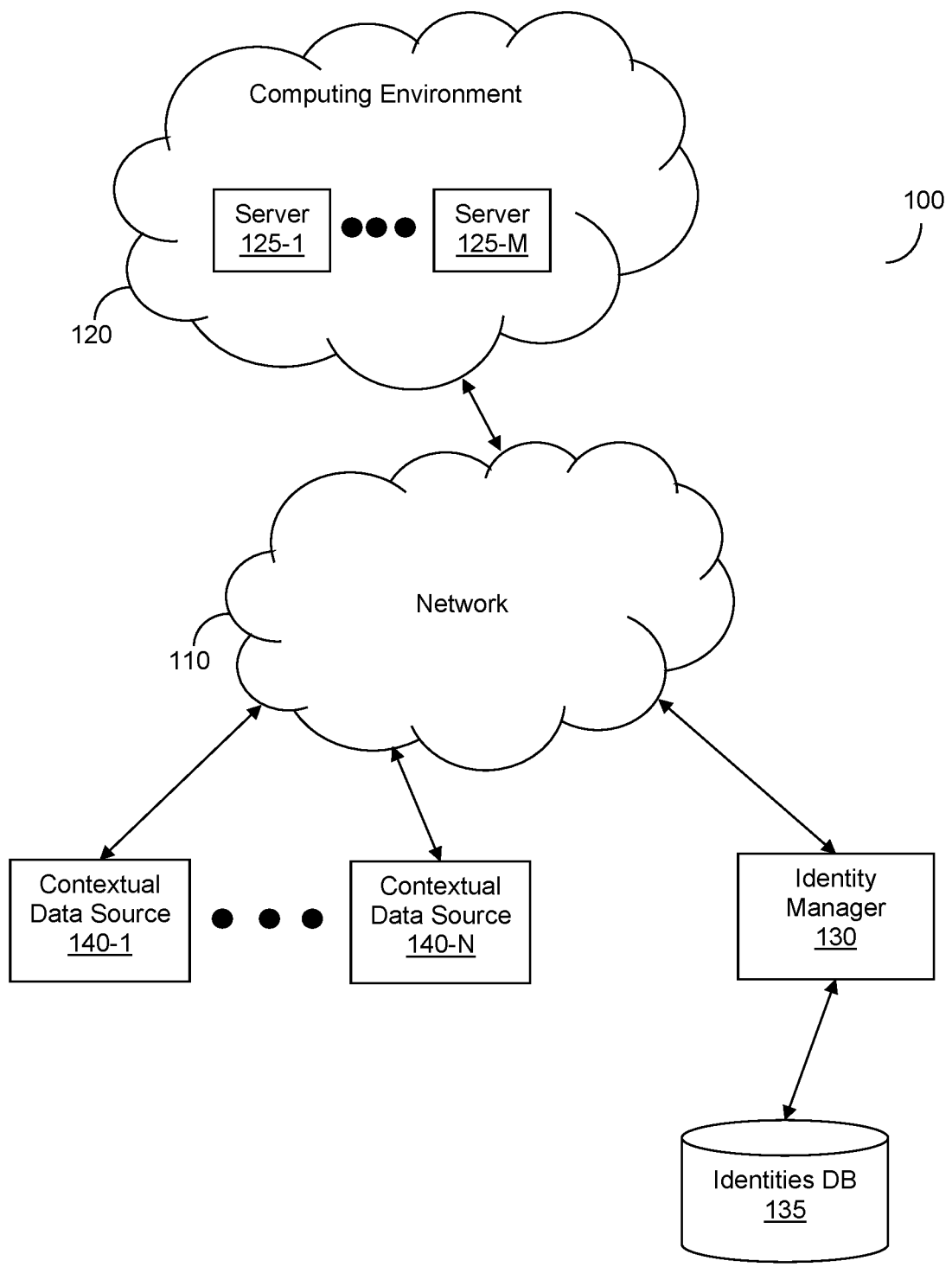
FIG. 1 is a network diagram utilized to describe various disclosed embodiments.

The various disclosed embodiments include techniques for automated secrets rotation and for mitigation of cyber threats using secrets rotation. In particular, various disclosed embodiments enable new methods for rotating secrets in an automated or semi-automated manner. The secrets rotation may be utilized to improve security within a computing environment, and may further be used to automate at least a portion of secrets rotation when secrets are to be rotated.

In an embodiment, a new secret is created and an old secret is rotated out by switching the old secret with the new secret. The rotation is verified based on use of the new secret and cessation of use of the old secret. Once the rotation has been verified as successful, the old secret is disabled. The rotation verification may be supported by identifying the old and new secrets via a graph, for example, a graph including mappings of contextually enriched machine identities. Further, the graph may be defined with respect to contextually enriched machine identities, thereby allowing for tracking use of the secrets when the same machine uses different identities.

The disclosed embodiments allow for automated secret management and mitigation of cyber threats using secrets rotation. Various disclosed embodiments enable automatic creation, disabling, and deletion of secrets and identities. In particular, various disclosed embodiments allow for supporting parallel secrets, i.e., such that two or more secrets can co-exist in order to enable replacement. More specifically, various disclosed embodiments include techniques which allow for copying identities and establishing policies with respect to automated rotation actions (e.g., policies defining times at which old secret are to be rotated out) which enable utilizing two secrets simultaneously for a limited period of time during the rotation. Further, various disclosed embodiments utilized contextually enriched machine identities in tandem with secrets management, which facilitates secrets rotation even when secrets are shared by multiple distinct entities, each of which may use multiple identities. In particular, using contextually enriched machine entities to track secrets usage allows for uniquely identifying uses of each secret by entities across different identities used by those entities, thereby enabling verifying that secrets have stopped being utilized by multiple entities.

Some disclosed embodiments provide secret manager integrations that allow for storing and managing secrets automatically. Some disclosed embodiments provide a streamlined workflow in order to align security and application users, in addition to or instead of Information Technology (IT) and DevOps users, to plug rotated secrets into existing management tools.

Further, the disclosed embodiments include techniques for vault creation and management, where vaults are data stores in which secrets may be stored. In particular, vaults may be linked to entities such as, but not limited to, applications whose secrets each vault stores. Vaults may further be linked to other entities (e.g., identities, users, resources, secrets, tags, etc.) which utilize an identifier of the linked application or other such entity, which in turn allows for correlating secrets to appropriate vaults for storage based on how and by who the secrets are used.

In this regard, it is noted that secret rotation can improve security of environments in which machine identities are utilized, but that automating secret rotation is a technical challenge that requires being able to accurately identify machines by their identities. The disclosed embodiments leverage contextual identity management techniques in order to enable automated secrets rotation, thereby allowing for new automated mitigation actions using such automated secrets rotation.

FIG. 1 shows an example network diagram 100 utilized to describe the various disclosed embodiments. In the example network diagram 100, components of a computing environment 120, an identity manager 130, and a plurality of contextual data sources 140-1 through 140-N (hereinafter referred to individually as a contextual data source 140 and collectively as contextual data sources 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The computing environment 120 may be, but is not limited to, a cloud environment or other computing environment for which identities of machines are to be managed. To this end, the computing environment 120 may include, but is not limited to, one or more servers 125-1 through 125-M, where M is an integer having a value equal to or greater than 1 (hereinafter referred to individually as a server 125 or collectively as servers 125).

Any or all of the servers 125 may utilize identities for purposes such as, but not limited to, authentication (i.e., verifying that a computing entity is what it says it is), authorization (determining applicable permissions for a computing entity), and the like, such that accurately identifying a given computing entity may improve security within the computing environment. The computing entity may be a machine, system, device, program, function, or other computing component which may access services or functions requiring entity-based authentication or authorization.

The identity manager 130 is configured to manage identities in accordance with at least some of the disclosed embodiments. In particular, the identity manager 130 is configured to rotate secrets as described herein. In some embodiments, the identity manager 130 is further configured to contextually enrich identity data in order to create contextually enriched identities for computing entities operating within or otherwise accessing components of the computing environment. The identity manager 130 may be further configured to resolve relationships, to graph identities, to mitigate cybersecurity threats, and to perform other functions in accordance with various disclosed embodiments.

The identities managed by the identity manager 130 may be identities of computing entities which utilize services realized, for example, via the servers 125 (e.g., by calling functions to those servers 125). As noted above, machines may have identities embedded within software run by those machines. Accordingly, in various disclosed embodiments, the identity manager 130 is configured to analyze software and other data stored on the servers 125 in order to resolve identities, to contextually enrich identities, both, and the like.

Identities resolved as described herein may be stored, for example, in an identities database (DB) 135 with which the identity manager 130 communicates. The identities database 135 may further store data related to those identities such as, but not limited to, graphs created as described herein. In particular, the identities database 135 may be or may include a contextual database (not shown) including contextual data retrieved with respect to identities managed as described herein.

To implement the disclosed embodiments, the identity manager 130 is configured to access data to be used for contextually enriching identities, for example from the contextual data sources 140. To this end, the identity manager 130 is configured to connect to integrations (not depicted in FIG. 1), where each integration incorporates functions of one or more respective services (also not depicted in FIG. 1) through which data stored in the contextual data sources 140 is accessible. More specifically, as described further below with respect to FIGS. 2A and 3, the identity manager 130 is configured to connect to integrations of services offered by computing service providers and to fetch or otherwise retrieve data via such connected integrations. The contextual data retrieved by the identity manager 130 in this manner may be stored in the identities database 135.

The contextual data stored in the identities database 135 may be from different computing service providers, and different portions of that contextual data may be structured in the manner it was in while stored in the respective contextual data source 140. In this regard, the contextual data may be stored in its original format rather than in a standardized or unified format in order to facilitate integration and reduce inconsistencies which may otherwise hinder identity management, violation detection, and mitigation as described herein.

Moreover, the contextual data stored in the identities database 135 may be assigned respective internal identifiers. Such internal identifiers may be defined per-integration, and may therefore be utilized to deterministically correlate data from each vendor (i.e., contextual data related to integrations related to the same computing service provider may be correlated on the basis of their internal identifiers which correspond to respective integrations, which in turn correspond to respective computing service providers). Such correlation may allow for more accurate identity management and therefore violation detection.

In some implementations, the identities database 135 may further store an integrations registry (not shown) defined with respect to internal identifiers. Such an integrations registry may map sources of data to respective integrations such that data from a particular source may be accessed via its respective integration using its internal identifier.

It should be noted that FIG. 1 depicts an identity manager as a component deployed outside of the computing environment 120 for example purposes, but that at least some of the disclosed embodiments are not limited as such. In some embodiments, any or all of the disclosed embodiments may be implemented or otherwise realized via computing components deployed in the computing environment such as, but not limited to, the servers 125. Moreover, the functions of the identity manager may be realized via dedicated computing systems such as servers, via virtual machines, via programs or other software-based components deployed on computing systems, combinations thereof, and the like.

FIGS. 2A-D are logical component diagrams utilized to describe various disclosed embodiments.

Figure 2A:
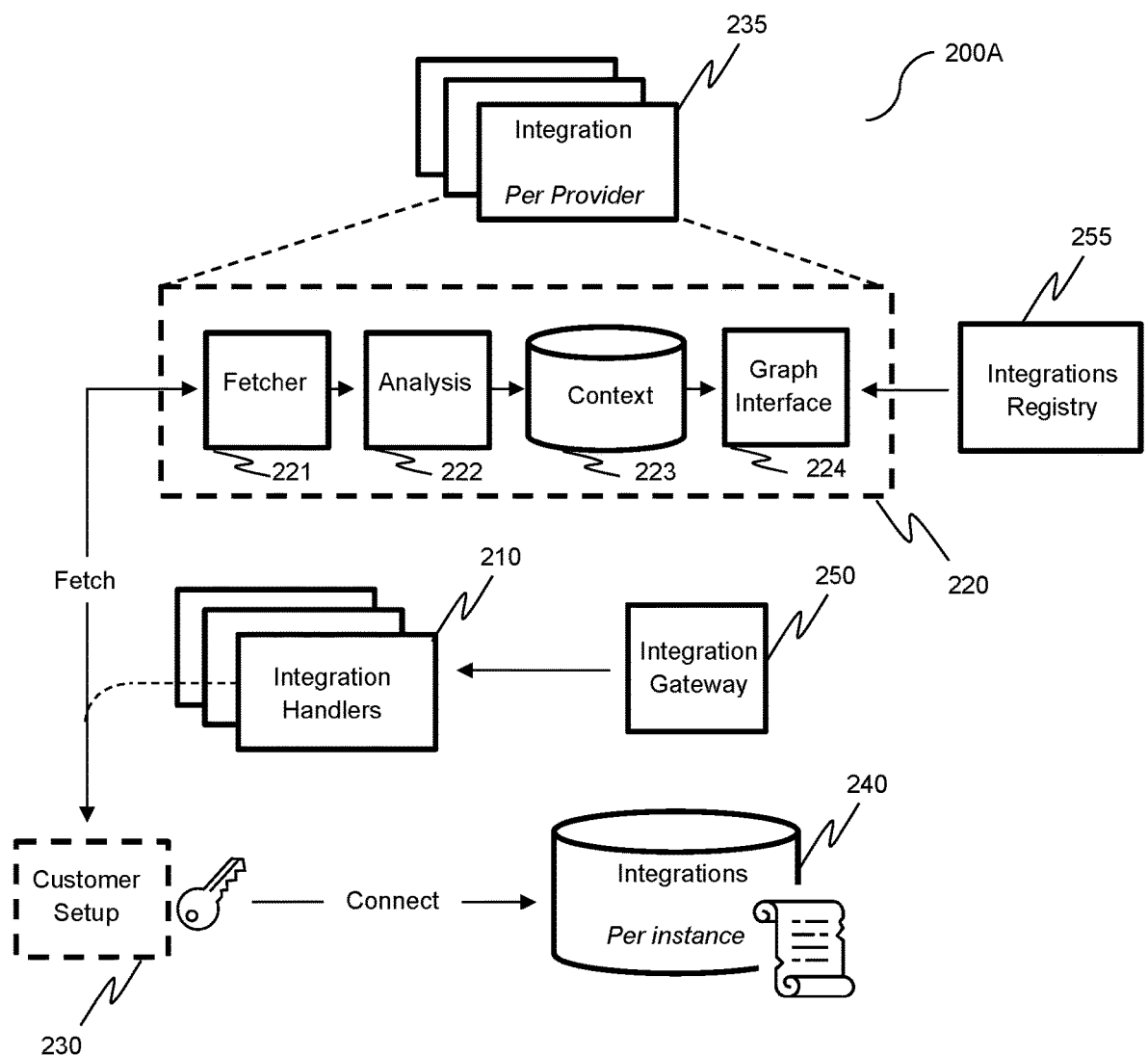
FIGS. 2A-D are logical component diagrams utilized to describe various disclosed embodiments.

FIG. 2A is a diagram 200A illustrating a flow of data during integration according to at least some disclosed embodiments. As illustrated in FIG. 2A, data is aggregated from multiple sources in order to facilitate contextual identity management in accordance with various disclosed embodiments. To this end, FIG. 2A depicts an integration handler 210 performing one or more integration logical components 220 and a customer setup 230. At least some of the data used by the integration logical components 220 is obtained via a connection between the customer setup 230 and one or more integration instances 240.

The integration handler 210 is configured to retrieve data (e.g., by fetching the data) from the integrations 230 via the integration instances 240. In some implementations, activities performed by the integration handler 210 are managed by an integration gateway 250. More specifically, the integration gateway 250 is configured to schedule and synchronize retrieval tasks, for example, tasks scheduled periodically.

The logical components 220 may include, but are not limited to, a fetcher 221, an analysis process 222, a context database 223, and a graph interface 224. The fetcher 221 retrieves data from one or more data sources (e.g., one or more of the contextual data sources 140, FIG. 1), for example based on fetch requests from the integration handler 210. The analysis process 222 analyzes the retrieved data in order to determine relevant parameters of the retrieved data.

Results of the analysis process 222 may be stored in the context database 223 for subsequent use, for example in order to contextually define identities as described herein. To this end, the context database 223 may further store internal identifiers as references for data stored therein which allows for deterministically correlating data from different computing service providers as described herein.

The graph interface 224 may provide an interface with which an integrations registry 255 may communicate. The integrations registry 255 may store a table mapping internal identifiers to respective integration instances 235 in order to allow external resources (e.g., the identity manager 130, FIG. 1) to retrieve data from appropriate integrations as needed.

Figure 2B:
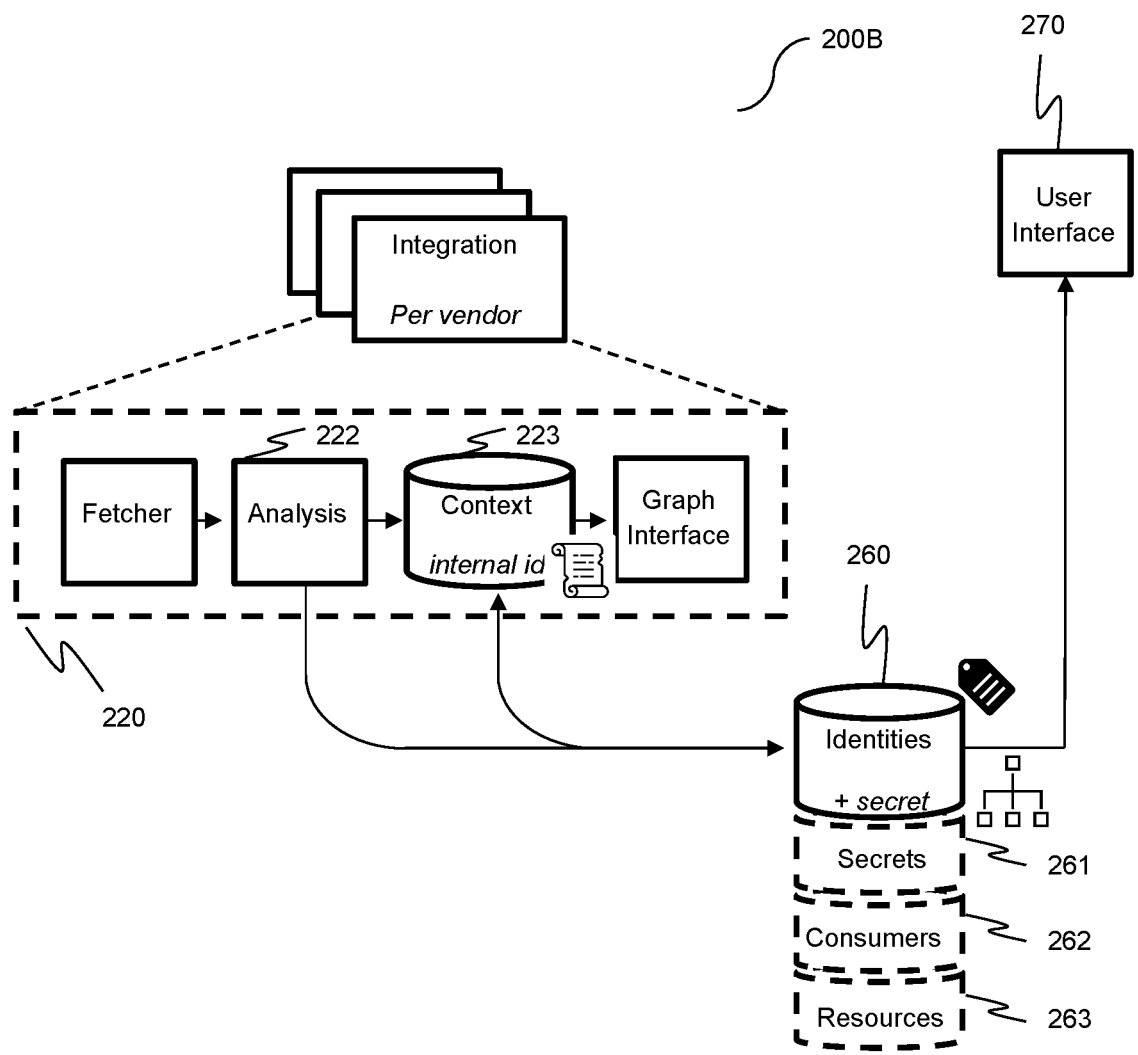

FIG. 2B is a diagram 200B illustrating a flow of identity management utilizing integration according to at least some disclosed embodiments. As illustrated in FIG. 2B, the logical components 220 of integration are utilized to define identities 260, which in turn may be provided to a user interface 270. Also illustrated in FIG. 2B, the identities 260 may be defined with respect to information such as secrets 261, consumers 262, and computing resources 263. The identities 260 may be defined based on results of the analysis process 222 and data stored in the context database 223.

Figure 2C:
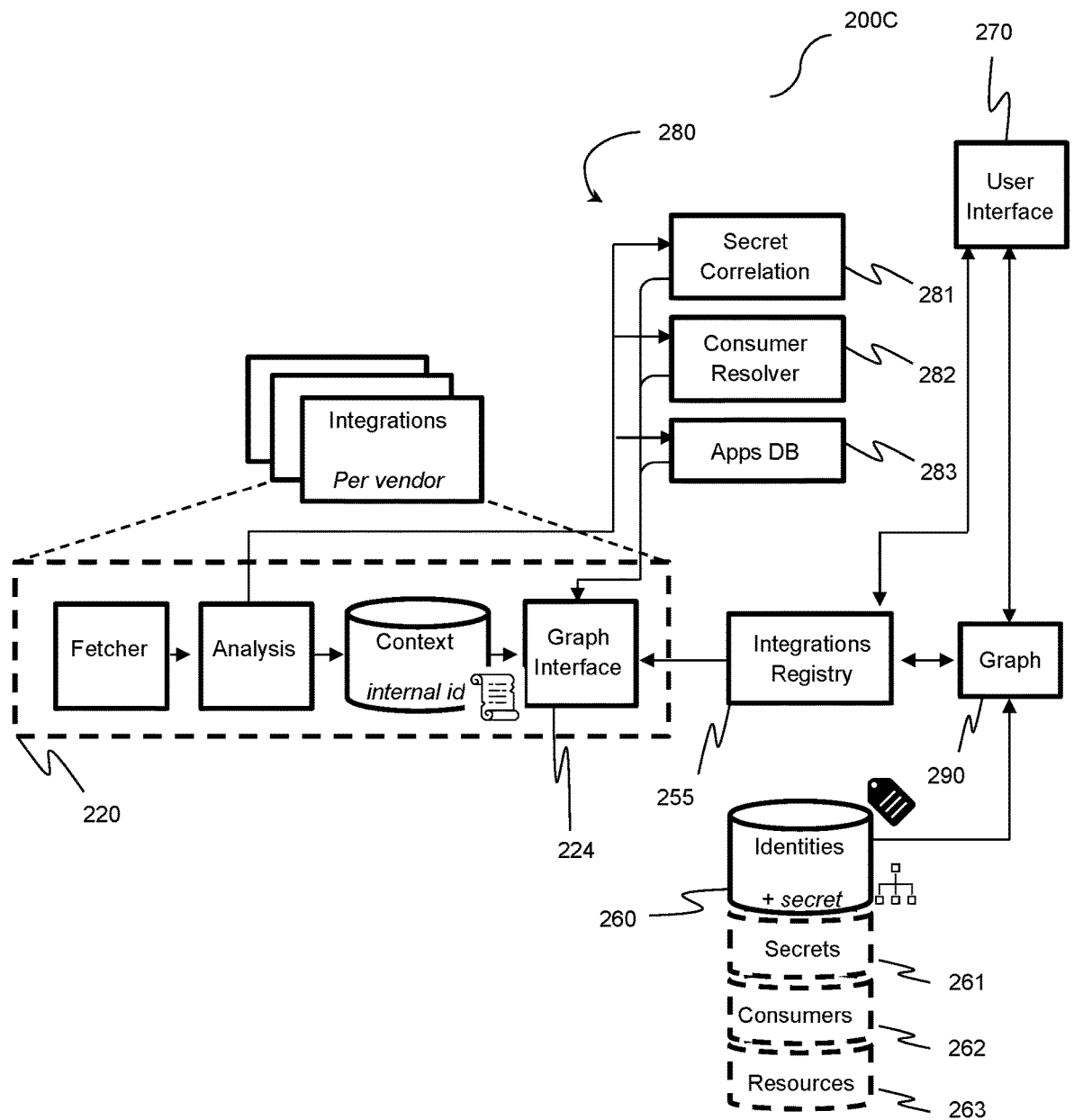

FIG. 2C is a diagram 200C illustrating a flow of contextual identification according to at least some disclosed embodiments. As illustrated in FIG. 2C, the logical components 220 are utilized in order to facilitate common feature identification processes 280 such as secret correlation 281, consumer resolver 282, and applications database (apps DB) analysis 283. The common feature identification processes 280 may be utilized in order to identify common features across different identities in order to aid in determining which identities may be of the same underlying computing entity. The results of common feature identification processes 280 may be provided to the graph interface 224 such that they can be accessed via the integrations registry 255.

Data accessed via the integrations registry 255 may be utilized in combination with the identities 260 in order to create a graph 290 as described herein. The graph 290 may be provided to the user interface 270 for display.

Figure 2D:
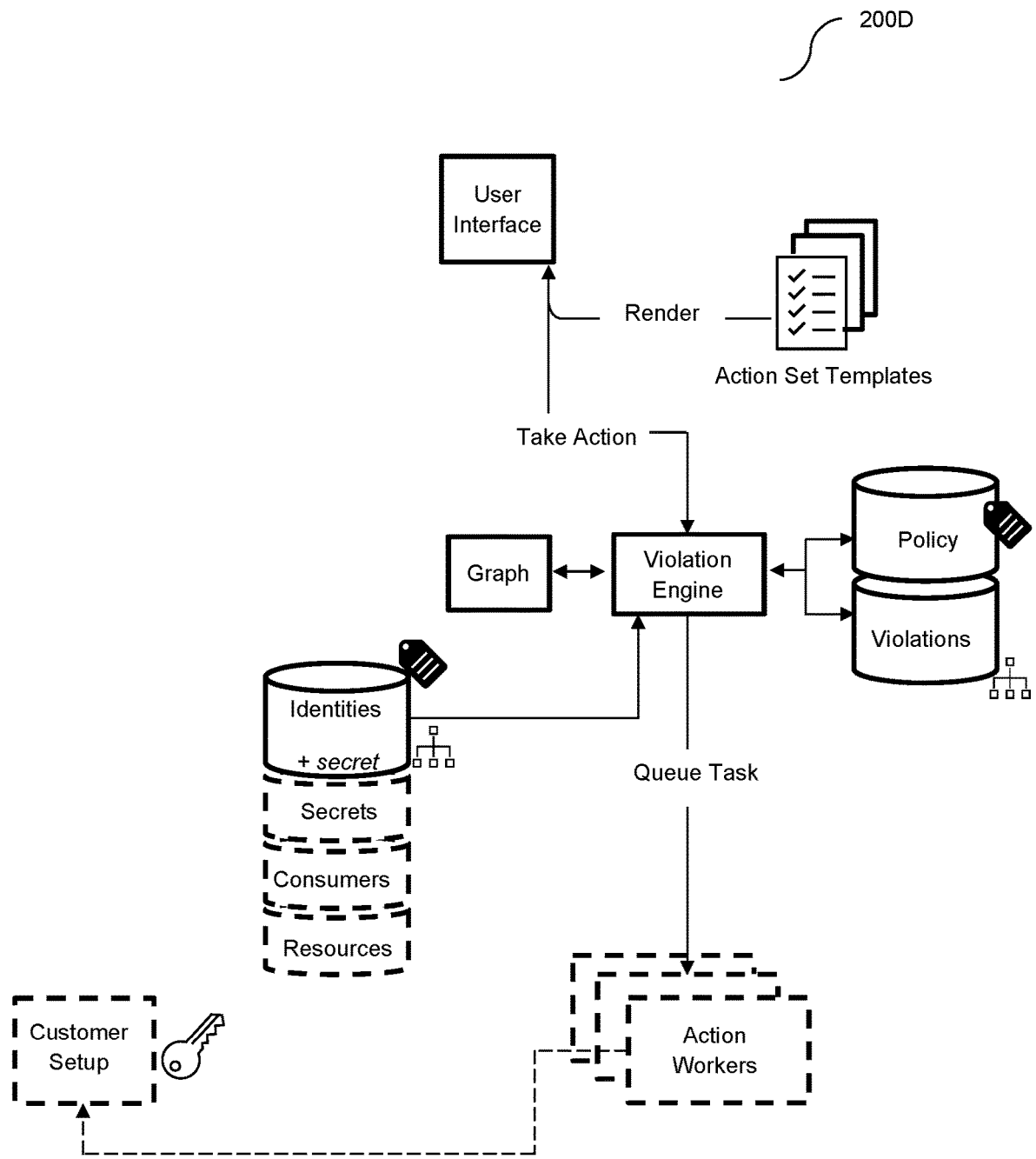

FIG. 2D is a diagram 200D illustrating a flow of violation detection and mitigation according to at least some disclosed embodiments. As illustrated in FIG. 2D, the graph 290 and the identities 260 are utilized by a violation engine 295 in order to detect one or more violations 296 based on one or more policies 297. Specifically, the policies 297 applied by the violation engine 295 may be policies attached to identities among the identities 260 which are monitored for violations by the violation engine 295. When a violation is detected by the violation engine 295, the violation engine 295 is configured to create sets of action steps for mitigation using one or more action set templates 298. To this end, the violation engine may cause display of such action set templates 298 or the action steps to a user via the user interface 270. Alternatively or in combination, the violation engine 295 may be configured to assign tasks to one or more action workers 299, which are configured to perform automated mitigation tasks via the customer setup 230.

Figure 3:
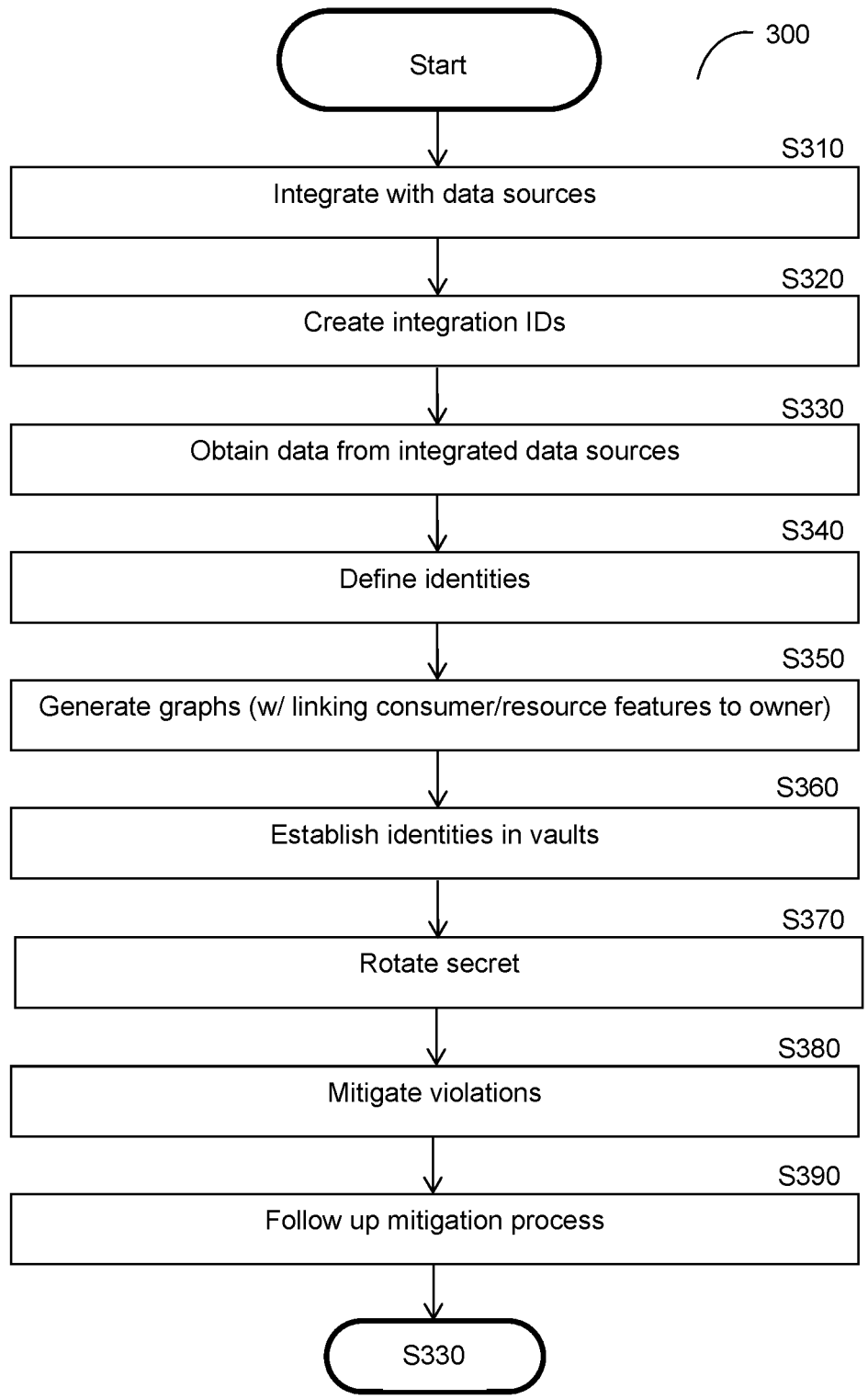
FIG. 3 is a flowchart illustrating a method for secrets rotation using contextual identity management according to an embodiment.

FIG. 3 is a flowchart 300 illustrating a method for contextual identity management according to an embodiment. In an embodiment, the method is performed by the identity manager 130, FIG. 1.

At S310, integration is performed in order to integrate with data sources. The integration process results in one or more integrations, where each integration includes code which interfaces with a respective service and each service is configured to access one or more data sources. In some implementations, each integration may be with respect to a service offered by a vendor such as a cloud service provider. In some further implementations, multiple integrations may be created for any given vendor. In an embodiment, S310 may include executing integration connection instructions for each integration to be created. In a further embodiment, the integration connection instructions are vendor-specific such that different integration connection instructions may be executed for integrations of different computing service providers.

The integrations allow for accessing data available via services offered by computing service providers. To this end, in an embodiment, a system deployed in order to perform identity management (e.g., the identity manager 130 or one or more of the servers 125, FIG. 1) is integrated with each applicable service such that the system becomes configured to access the functions, data, or both, provided via that service. In a further embodiment, S310 includes creating an identity or role for the identity manager (e.g., the system configured to perform identity management or a program executed via such a system) with respect to each integration to be created and defining connection instructions for each provider of one or more services to be integrated.

Once the integrations have been created and connected to the identity manager system or program, data may be fetched via the connected integrations. A non-limiting example integration process is described in more detail above with respect to FIGS. 2A-D.

At S320, integration identifiers (IDs) are created. Specifically, an integration identifier is created for each integration created at S310. Each integration identifier is created so as to uniquely identify its respective integration, i.e., such that the integration identifier corresponds to that integration and only that integration.

At S330, data is obtained from the integrated data sources. In an embodiment, S330 includes fetching or otherwise retrieving the data via the integrations.

At S340, identities of computing entities are defined based on the data obtained from the integrated data sources. Each computing entity identity is an object to which an access policy is attached and may be created by the computing service provider integration which manages the identity. Further, each computing entity identity may have metadata attached thereto indicating information such as, but not limited to, name, policy, creation time, resources accessed (e.g., resources accessed via use of computing services), combinations thereof, and the like. Each identity may have additional pieces of data attached to them such as, but not limited to, secrets.

In various embodiments, each computing entity identity has multiple fields storing data related to the identity, use of the identity, changes to the identity, combinations thereof, and the like. Non-limiting examples for identity data in such fields may include, but are not limited to, internal identifier, name, source computing service provider, time of last use, time of last modification key type, combinations thereof, and the like.

In an embodiment, the data may be analyzed at S340 upon obtaining the data. In another embodiment, data may be obtained from the integrated data sources over time and analyzed in batches. In such embodiments, the data may be retrieved and stored into storage rather than databases in order to reduce computing resource consumption and to allow for adding features with respect to existing integrations without requiring again retrieving data and migrating data structure.

An example process for defining entities is described further below with respect to FIG. 4.

At S350, a graph is generated. The generated graph at least maps consumers of resources to the resources they consume, either directly or indirectly (e.g., indirectly via accessing a secret management system in order to gain access to the resource). In some embodiments, the graph may further map secrets to consumers who own the secrets, secrets assigned to particular secret management systems, secrets to the resources they are used to access, combinations thereof, and the like.

In an embodiment, the graph includes nodes representing at least consumers, secret management systems, and resources, as well as edges representing communications or other connections between nodes. Consumers are clients who use the selected identity. Secret management systems such as key management systems (KMSs) are services used to store secrets of the selected identity to be used by consumers. Resources are objects accessible to the selected identity. Each node may be identified by a respective internal identifier as described herein as provided by the respective integrations. In some embodiments, graphs are generated on demand when an entity is selected.

A graph generated as described herein allows for representing an identity of a computing identity in context and provides a qualitative view rather than a quantitative view as would be provided by, for example, solutions utilizing an identity table. Consequently, the graph may allow for applying access policies in a manner which accounts for all potential connections of a computing entity represented by potentially different source identities, thereby allowing for identifying potentially new violations which may not be detected using identity data out of context.

In a further embodiment, the graph may be generated based further on standardized relationships, for example, the standardized relationships generated as discussed below with respect to FIG. 4.

At S360, identities are established in one or more secret vaults. Establishing the identities may include, but is not limited to, linking identifiers of entities (e.g., entities who are consumers of resources) to respective vaults (e.g., respective secret vaults). In an embodiment, the identities are established as described further below with respect to FIG. 5.

The identities to be established may be selected by a user, and may be identities for which identity management is desired (e.g., an identity whose activities are to be monitored in order to detect potential violations of policies). Alternatively, the identities may be selected based on use, for example, based on an authentication or other activity which utilized identity for which contextually enriched identity data would aid in more accurately identifying the respective computing entity, for example in order to more accurately enforce access policies and detect potential violations thereof.

At S370, a secret is rotated. In particular, a first old secret is rotated such that the old secret is replaced with a second new secret. In other words, the old secret is rotated out and the new secret is rotated in such that the old secret ceases being used and the new secret is used instead. In an embodiment, the secret rotation is performed as described further below with respect to any or all of FIGS. 7-10.

Each of the old secret and the new secret is a digital authentication credential used to access one or more resources. Each secret may be, but is not limited to, a password, an access token, a private key, and the like. The secrets may be utilized to authenticate to a secret manager which manages use of secrets to access the resource in order to gain access to the resource. To this end, a copy of the secret is held by an entity such as a consumer, and the consumer gains access to the resource by providing the secret when authenticating to the secret manager.

At S380, potential violations are mitigated with respect to the rotated secret. In an embodiment, S380 may include analyzing the generated graph for potential violations, for example, violations of access policies which may be identified based on connections demonstrated in the graph. In some embodiments, the violations may be defined with respect to secrets use. A non-limiting example process for mitigation is described further below with respect to FIG. 5.

At S390, one or more follow-up activities are performed with respect to the mitigations performed at S380.

The follow-up activities may be performed, for example, in order to run one or more entitlement processes. Such entitlement processes may allow for automating access controls and for providing follow-up functionality in order to, for example, follow up on mitigation actions. In this regard, access policies or other policies utilized in accordance with various disclosed embodiments may define expiration time periods (e.g., time periods defined with respect to when a given secret was used to authenticate) or otherwise define conditions for following up which may be monitored with respect to a contextually enriched identity graphed as discussed above.

Figure 4:
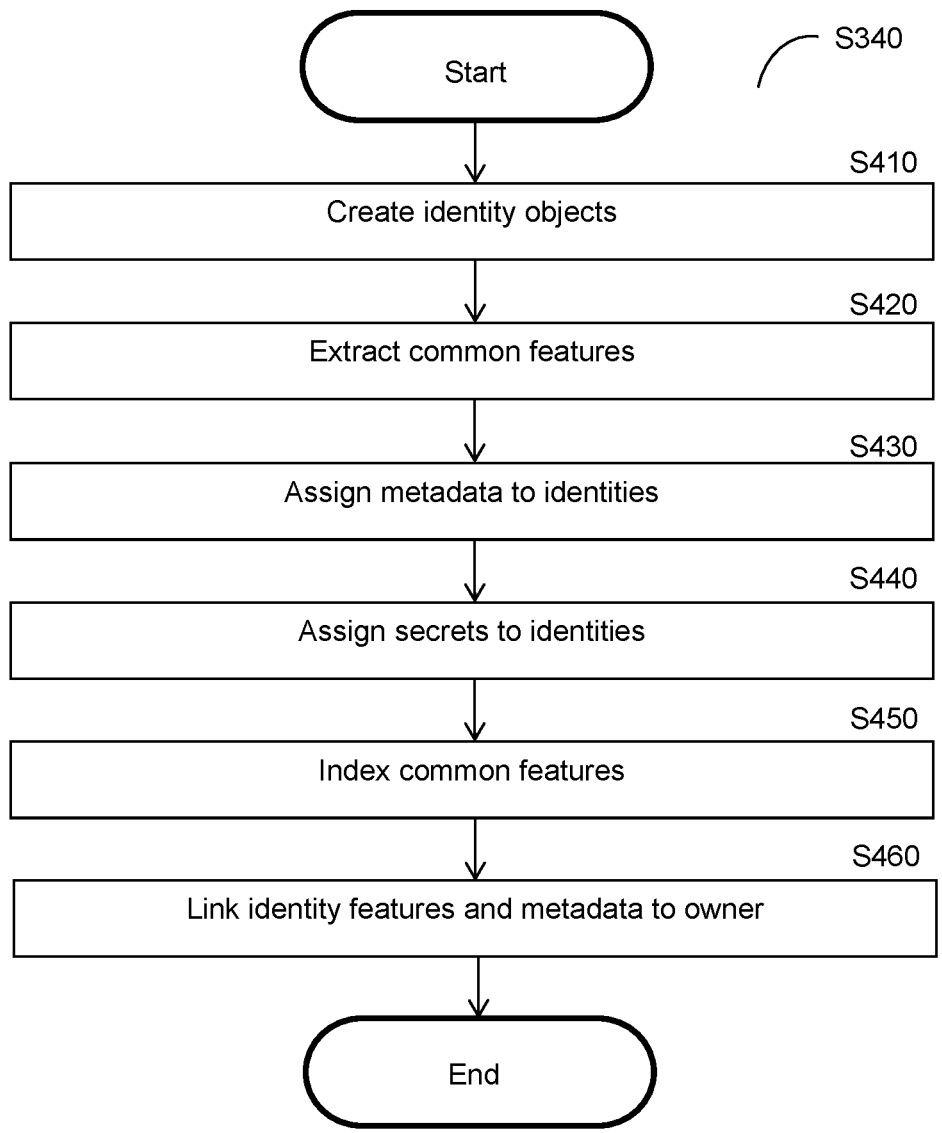
FIG. 4 is a flowchart illustrating a method for defining identities according to an embodiment.

FIG. 4 is a flowchart S340 illustrating a method for defining identities according to an embodiment.

At S410, identity objects are created. Each identity object has metadata related to an underlying identity (e.g., an identity used with respect to an integration or otherwise with respect to a particular computing service provider).

Policies (e.g., access policies) may be attached to identities in order to define permissions or prohibitions with respect to actions, behaviors, access, or other circumstances for each identity. Deviations from these policies (e.g., performing an action which is forbidden or otherwise not permitted) may result in detecting a violation to be mitigated as described herein.

In some implementations, policies may be attached to identities indirectly, for example but not limited to, based on tags or other commonalities among identities. As a non-limiting example, each identity is assigned one or more tags based on common features, metadata, or both. In such an example, policies may be attached via tags insofar as each policy is applied with respect to identities having the tags with which the policy is defined.

At S420, common features are extracted. The common features are features of identities which may be used across different computing service providers or otherwise by different identities. In other words, common features are features which may be utilized by different identities of the same computing entity. As a non-limiting example, a computing entity may use the same secret across its different identities for different cloud service providers such that use of that secret is indicative that the identity which uses that secret relates to the same underlying computing entity as another identity which uses that secret.

The common features extracted at S420 may include, but are not limited to, secrets, consumers, correlated data from different data sources, combinations thereof, portions thereof, and the like. To this end, in an embodiment, S420 includes any or all of correlating secrets resolving common consumers, and correlated data from integrated data sources.

In an embodiment, secrets are correlated. Specifically, secrets utilized by consumers to log in as identities are correlated to each other. More specifically, use of the same secret across cloud providers may be identified within contextual data obtained from those computing service providers (e.g., from the contextual data sources 140, FIG. 1). Use of the same secret across cloud identifiers may help in identifying related identities for those computing service providers.

In an embodiment, common consumers are resolved. More specifically, appearances of consumers within contextual data may be resolved as being appearances of the same consumer based on available data such as, but not limited to, open source data. As a non-limiting example, a login Internet protocol (IP) address may be matched to information of a domain lookup site. As another non-limiting example, domains in which data demonstrating appearances of consumers may be matched to domains of known computing service providers.

In an embodiment, data obtained from integrated data sources are correlated with respect to available data which is common to different integrated data sources (e.g., data which is utilized by both of two different integrated data sources may be common to those data sources). As a non-limiting example, a cloud computing machine may be correlated to a relational database management system (RDBMS) based on data indicating a login of the cloud computing machine to the RDBMS.

The data correlated between integrated data sources may be stored in a database, for example, an applications (apps) database. To this end, such an apps database may be further populated with the common information used for correlation in order to enable the correlation. The common information may be provided via manual entry (e.g., by integrating with one or more asset management systems having manually entered data) or by populating the apps database with open source data (e.g., by integrating with one or more known IP addresses of services which are known to be used across different computing service providers such as a messaging service). To this end, in some embodiments, S420 further includes performing such integration with sources of common information data.

At S430, metadata is assigned to identities with respect to the created identity objects. The metadata indicates aspects of the identity such as, but not limited to, name, policy, creation time, resources accessed by the identity, user ownership or user responsibility for each identity (e.g., a user who is assigned to the identity as owner or otherwise responsible for the identity), combinations thereof, and the like. The kinds of metadata assigned to each identity may be type-specific metadata which vary depending on a type of the identity (e.g., a type of computing entity represented by the identity).

In an embodiment, the assigned metadata includes metadata indicating common features extracted at S420. Such metadata indicating the common features may therefore be utilized to index the respective identities, which in turn aids in correlating between identities with respect to the common features.

At S440, secrets are assigned to the identities with respect to the created identity objects. The secrets may include, but are not limited to, passwords, access tokens, private keys, combinations thereof, and the like. In some embodiments, the secrets may further have metadata such as, but not limited to, type-specific metadata. Non-limiting examples of metadata for secrets include creation time, login time, expiration, and the like.

At S450, common features are indexed based on the metadata assigned to the identities. The indexing may be an organized list of common features defined with respect to identities for which each common feature is shared (i.e., multiple identities having the same feature in common may be indexed together under an entry for that common feature). The indexing allows for more efficiently correlating identities during subsequent processing, particularly when the correlation is used for generating graphs on demand as discussed above.

At S460, identity features and metadata are linked to an owner. More specifically, the identity objects and their respective metadata are assigned to nodes representing respective owners to be included in a graph (e.g., the graph discussed above with respect to S350). The identity features may be features indicating aspects of respective entities which may be utilized to contextually identify the entities as described herein. Linking the identity features to an owner therefore effectively associates a given entity that is contextually defined via those identity features to the owner.

In an embodiment, the identity features are features associated with respective identities of computing entities. Each computing entity identity is an object to which an access policy is attached and may be created by the computing service provider integration which manages the identity.

It should be noted that various steps depicted in FIG. 4 are shown in a particular order merely for example purposes, but that the disclosed embodiments are not necessarily limited to such an order. For example, any of the secrets correlation, resolution of common consumers, and correlation of records from integration may be performed in a different order without departing from the scope of the disclosure.

Figure 5:
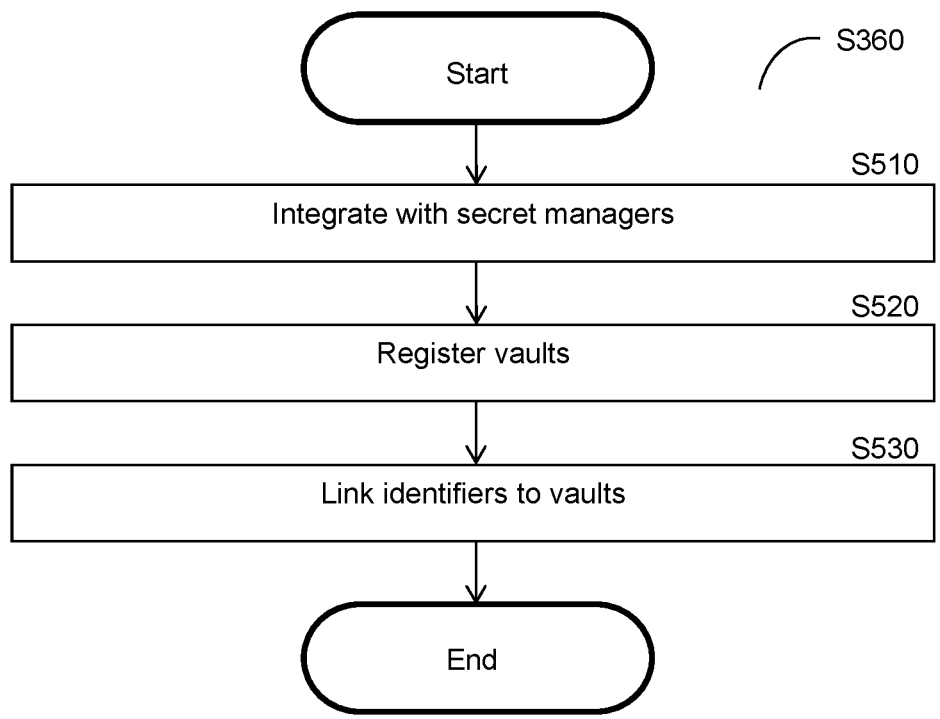
FIG. 5 is a flowchart illustrating a method for establishing identities in secret vaults according to an embodiment.

FIG. 5 is a flowchart S360 illustrating a method for establishing identities in vaults according to an embodiment.

At S510, integration is performed in order to integrate with one or more secret managers. More specifically, a system performing the method of FIG. 5 (e.g., the identity manager 130, FIG. 1) is integrated with the secret managers in order to allow for accessing functions of the secret managers.

In an embodiment, the integration process results in one or more integrations, where each integration includes code which interfaces with a respective service (i.e., a service of a secret manager) and each service is configured to access one or more data sources (e.g., secret vaults storing secrets managed by the secret manager). In some implementations, each integration may be with respect to a service offered by a vendor such as a cloud service provider. In some further implementations, multiple integrations may be created for any given vendor. In a further embodiment, S510 may include executing integration connection instructions for each integration to be created. In a further embodiment, the integration connection instructions are vendor-specific such that different integration connection instructions may be executed for integrations of different computing service providers.

The integrations allow for accessing data available via services of the integrated secret managers such as, but not limited to, instances of secrets, data indicating use of secrets (e.g., secrets use logs), both, and the like. To this end, in an embodiment, a system deployed in order to perform identity management (e.g., the identity manager 130 or one or more of the servers 125, FIG. 1) is integrated with each applicable service such that the system becomes configured to access the functions, data, or both, provided via that service. In a further embodiment, S510 includes creating an identity or role for the identity manager (e.g., the system configured to perform identity management or a program executed via such a system) with respect to each integration to be created and defining connection instructions for each provider of one or more services to be integrated.

Once the integrations have been created and connected to the identity manager system or program, data may be fetched via the connected integrations. The data may be used, for example, in order to confirm that an old secret has ceased to be used and that a new secret is being used as described herein with respect to FIG. 10. A non-limiting example integration process is described in more detail above with respect to FIGS. 2A-D.

At S520, one or more vaults are registered. In an embodiment, each vault is a secret vault, which is a data store at least storing secrets used to access respective resources. The secret vaults may be or may include, but are not limited to, vault applications which are configured to hide content in respective device using secrets managed by the integrated secret managers. In an embodiment, registering the secret vaults includes recording metadata stored in the vault as well as access policies utilized by the vault. In a further embodiment, S520 includes establishing monitoring of access via access logs maintained by the registered secret vaults. Based on the metadata and access policies recorded during registration, the access logs may be monitored for use of respective secrets in order to verify rotation as described herein (e.g., monitoring to determine whether an old secret has ceased to be used, whether a new secret has been used, or both).

At S530, identifiers are linked to the registered secret vaults. The linked identifiers include, but are not limited to, identifiers of consumers of resources such as, but not limited to, application identifiers of applications which access resources using secrets in the registered secret vaults.

Figure 6:
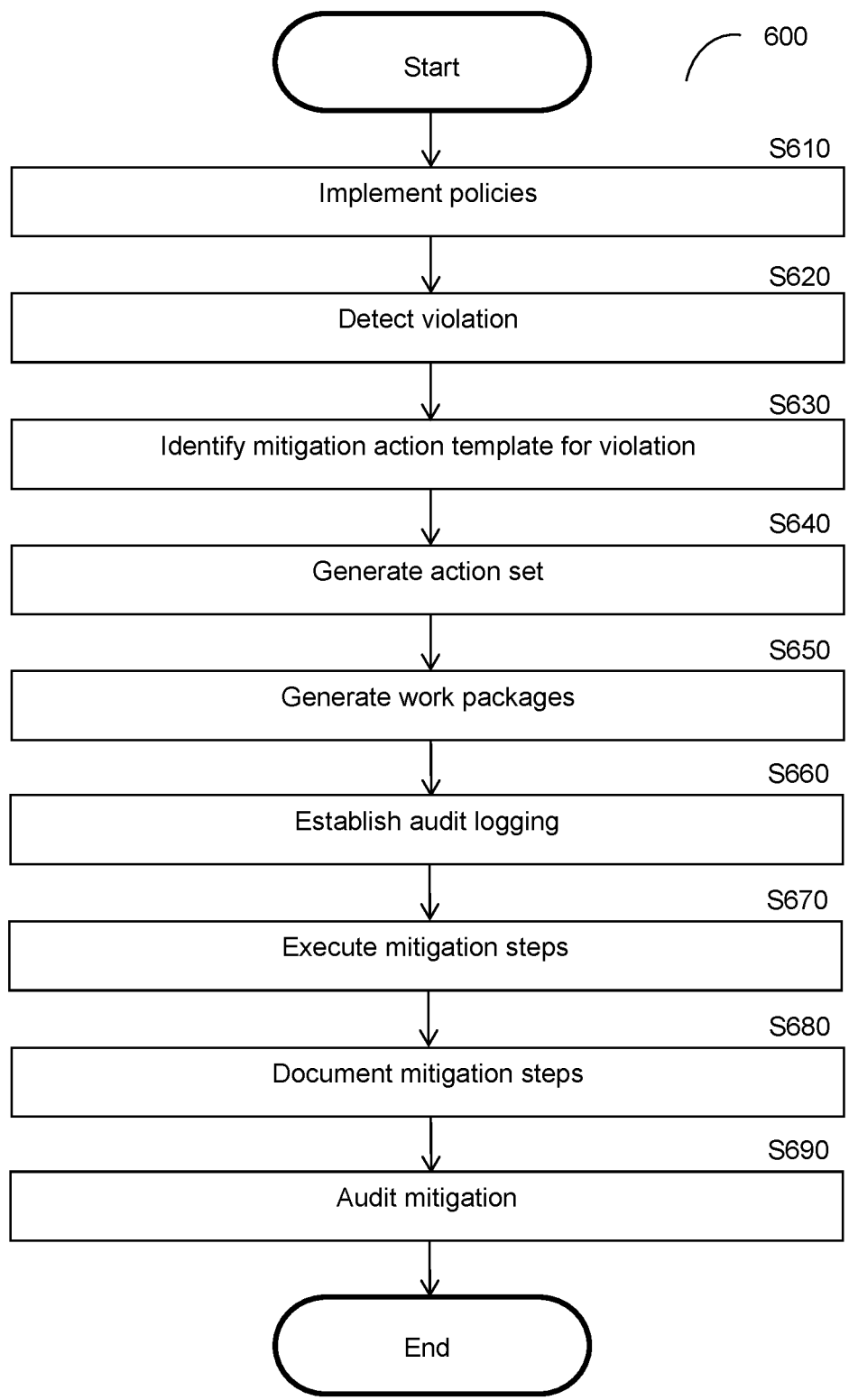
FIG. 6 is a flowchart illustrating a method for mitigating cybersecurity threats using rotation of contextual identities according to an embodiment.

FIG. 6 is a flowchart 600 illustrating a method for mitigating cybersecurity threats using rotation of contextual identities according to an embodiment. In an embodiment, the method is performed by the identity manager 130, FIG. 1.

At S610, one or more policies are implemented. In an embodiment, at least some of the policies are defined with respect to rotation. As a non-limiting example, a policy may be defined with respect to rotation out of an old secret by defining violations of the policy based on criteria related to rotation out of the old secret such as, but not limited to, use of the old secret after a predetermined period of time since the old secret was successfully rotated out (e.g., since a time at which a rotation involving rotating the old secret out was verified or a time at which the old secret was disabled), use of the old secret by consumers that are not associated with the old secret, both, and the like. Violations of the policy may be predefined with respect to different sets of criteria such that a violation meeting one or more criteria is identified as a certain type of violation used for determining mitigation actions as described further below.

At S620, a violation of one or more of the policies is detected. The violation may be detected by monitoring activity in a computing environment (e.g., the computing environment 120, FIG. 1) and, in particular activity including use of secrets within the computing environment. In an embodiment, S620 further includes determining a type of the violation based on criteria met by the activity which triggered the violation.

At S630, a mitigation action template for mitigating a potential cyber threat is identified based on the detected violation. In an embodiment, each type of violation has assigned thereto a predetermined mitigation action template. When a violation of that type is detected, the mitigation action template may be identified, for example, by looking up the template in a dataset indicating violation types and their assigned mitigation action templates At S640, an action set for mitigating the violation is generated based on the mitigation action template. In an embodiment, S640 includes identifying violation parameters of the violation and generating the action set based on the mitigation action template and the violation parameters. The violation parameters may be generated and attached to the violation by the policy which was used to detect the violation. The action set includes steps which can either be executed by a user or on a system deployed with respect to a computing environment in order to mitigate the violation.

At S650, one or more work packages are generated based on the action set. More specifically, work packages may be generated in order to group mitigation steps of the action set with mitigation steps of other action sets created for other violations. To this end, each work package is a group of mitigation steps of multiple action sets that is grouped based on commonalities between action sets of different violations. In a further embodiment, violations having action sets that are similar (e.g., define similar mitigation steps) or otherwise overlap (e.g., including one or more of the same mitigation steps) may be identified, and action sets of those identified violations may be grouped into work packages.

Similarities between action sets of violations may be determined based on, for example but not limited to, commonalities among mitigation action templates identified for each violation, commonalities among mitigation steps between action sets, commonalities between locations (e.g., locations within a computing infrastructure) on which mitigation steps are to be performed according to action sets, commonalities between computing resources on which mitigation steps are to be performed according to action sets, combinations thereof, portions thereof, and the like. Grouping similar or overlapping action sets allows for reducing some redundant actions during mitigation, thereby improving efficiency of mitigation.

At S660, audit logging is established. In an embodiment, the audit logging may be established with respect to a graph created as described above or otherwise with respect to communications, connections, or other relationships between one or more identities and one or more computing resources or other portions of computing infrastructure accessed by those identities. To this end, S660 may include establishing monitoring with respect to identities of a computing entity. The audit logging may be established so as to collect data related to changes in the computing resources or other portions of the computing infrastructure which may be utilized, for example, in order to determine whether mitigation actions were successful.

At S670, mitigation actions are executed using the generated action set. The mitigation actions are performed in order to mitigate potential exploitation of vulnerabilities through identity or access misuse and may include, but is not limited to, revoking access, changing access permissions, ceasing communications, rotating secrets, combinations thereof, portions thereof, and the like.

At S680, the mitigation steps are documented. In an embodiment, S680 includes storing data indicating which mitigation steps were performed and with respect to which computing resources or portions of a computing infrastructure those mitigation steps were performed. Such data may be referenced during subsequent processing, for example during mitigation auditing at S690, in order to check for potential failures to mitigate.

At S690, mitigation auditing is performed with respect to the documented mitigation steps and the audit logging. As noted above, audit logging may be established in order to monitor changes (e.g., changes to a computing infrastructure, changes to computing resources, changes in behavior, etc.) with respect to identities of a computing entity. To this end, in an embodiment, S690 includes applying one or more mitigation auditing rules based on the documented mitigation steps and audit logs created during the audit logging in order to determine whether mitigation actions were successful. Further, the mitigation auditing rules may define success of mitigation actions, for example, with respect to expected changes that would occur when mitigation actions are successful. Such expected changes may be predetermined changes based on, for example, types of mitigation actions, where mitigation actions are performed relative to the computing infrastructure or with respect to one or more process flows, which computing resources are acted upon during mitigation, combinations thereof, and the like.

As noted above, in at least some implementations, follow-up activities may be defined with respect to mitigation actions. The audit logs may be analyzed with respect to the conditions for performing these follow-up activities in order to determine whether and which follow-up activities are to be performed. In this regard, the audit logs may be checked for certain changes in computing resources that would be expected based on performing certain mitigation actions, and follow-up activities may be performed if the changes have not been realized, for example, if the audit logs do not indicate those changes.

Figure 7:
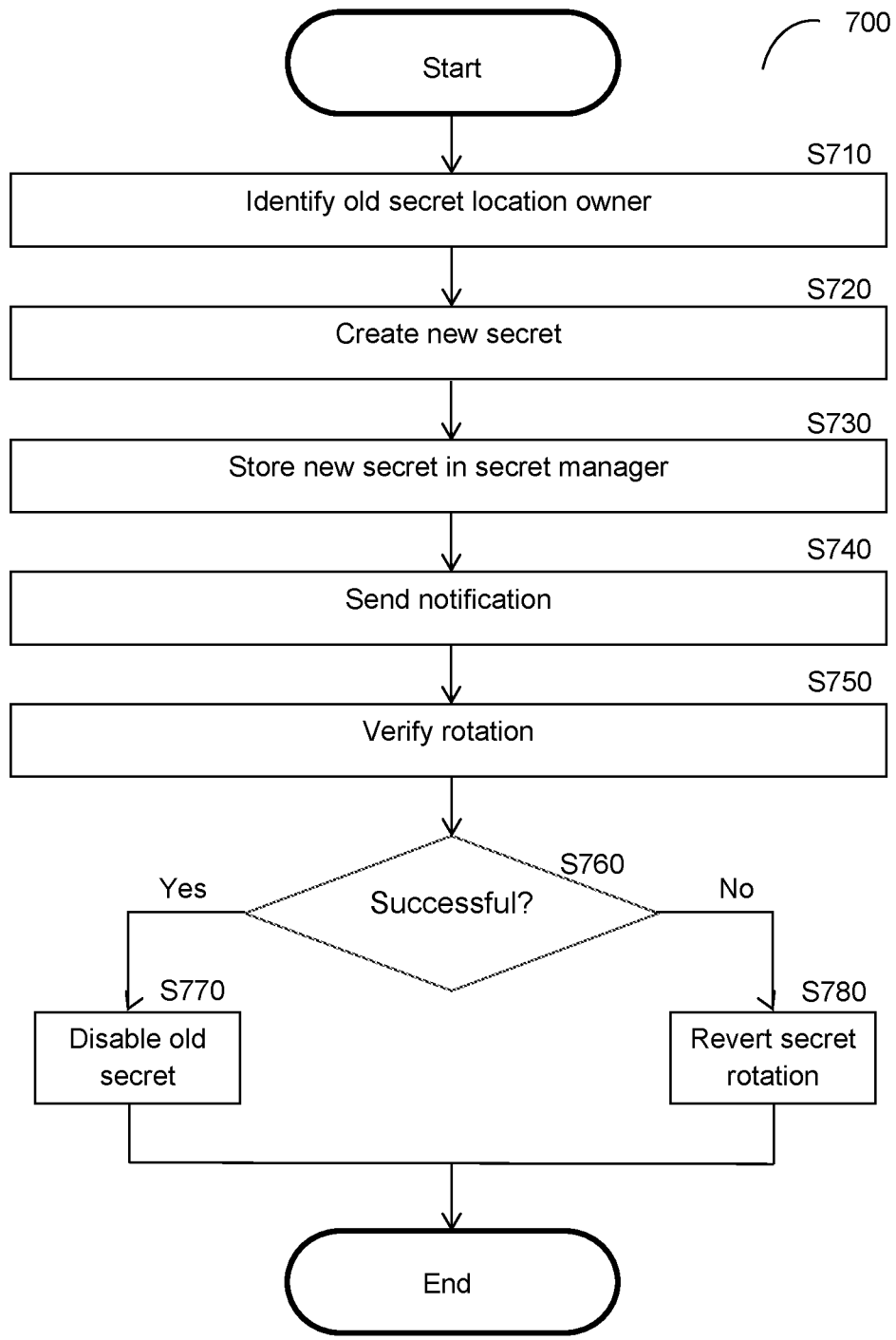
FIG. 7 is a flowchart illustrating a method for verifying rotation success according to an embodiment.

FIG. 7 is a flowchart 700 illustrating a method for verifying rotation success according to an embodiment.

At S710, an owner of a first old secret to be rotated is identified. In an embodiment, the owner is identified based on associations between secrets and consumers represented in a graph (e.g., the graph as discussed above with respect to S350). Specifically, a consumer represented by a first node which is connected to a second node representing the old secret in the graph may be identified as the owner of the old secret. The owner may be, but is not limited to, a user, a machine (e.g., a system or a virtual machine), and the like. In some embodiments, the owner is a machine having a contextually enriched machine identity created as described herein.

At S720, a second new secret is created. The new secret may be randomly generated or otherwise generated such that the new secret is different from the old secret.

At S730, the new secret is stored in a secret vault. In an embodiment, the new secret is stored in a secret vault in which the old secret is or was stored. In another embodiment, the new secret is stored in a secret vault which is accessible to a secret manager which manages or had managed the old secret. In an embodiment, the new secret is stored in the secret vault as described further below with respect to FIG. 8.

At optional S740, when the owner identified at S710 is a user, a notification indicating the new secret is sent to the owner. In some embodiments, S740 may further include moving the secret from the secret vault to a new secret vault, for example upon request from the owner. In an embodiment, the notification is sent as described further below with respect to FIG. 9.

At S750, verification is performed in order to determine whether the new secret has been successfully rotated in, i.e., whether the new secret has been successfully implemented. In some embodiments, the verification is performed after a predetermined period of time has passed (e.g., a predetermined period of time since the new secret was created) such that, if the new secret has not been successfully rotated in within the predetermined period of time, it is determined that the secrets rotation is not successful. In other words, the rotation is determined to be successful when the new secret has been successfully rotated within the predetermined period of time. In an embodiment, rotation is verified as described further below with respect to FIG. 10.

At S760 it is checked whether the secret rotation is successful and, if so, execution continues with S770; otherwise, execution continues with S780. In an embodiment, S760 includes confirming that the old secret has ceased being used by one or more consumers and that the new secret has been used by each of those consumers. An example method for verifying secret rotation is described further below with respect to FIG. 10.

At S770, when the new secret has been determined to be successfully rotated in, the old secret is disabled, thereby completing the secrets rotation process. In an embodiment, the old secret is disabled via one or more integrations with secret managers, for example, as discussed above with respect to FIG. 5. To this end, S770 may include communicating with a secret manager which manages the old secret via an application programming interface (API) in order to request disabling of the old secret.

At S780, when it is determined that the new secret has not been successfully rotated in, the rotation may be reverted such that the old secret remains valid and the new secret is not used as the secret. To this end, S780 may include, but is not limited to, re-enabling any disabled secrets, deleting the new secret, both, and the like.

More specifically, in some embodiments, as the criteria for secret rotation (i.e., cessation of use of an old secret as well as use of a new secret) are confirmed for each consumer, the old secret may be disabled in a location of an instance of the old secret associated with that consumer. When the secret rotation has not been verified for one or more of the consumers after a predetermined period of time, it may be determined that the secret rotation was unsuccessful, and the secret rotation may be reverted across all consumers by re-enabling the disabled instances of the old secret.

It should be noted that the steps of FIG. 7 are depicted in a particular order for example purposes, but that the various disclosed embodiments are not necessarily limited as such. In particular, in some embodiments, a notification indicating a potential new secret may be generated and sent to an owner of an old secret before creating and storing the new secret. In such an embodiment, the new secret may be created and stored when the owner who received the notification takes action (e.g., by interacting with a user interface displayed pursuant to the notification) to request creation of the new secret. In such embodiments, the notification may be generated and sent when certain circumstances have occurred such as, but not limited to, passage of a predetermined amount of time since a most recent secret rotation (i.e., to prompt the owner to rotate the secret in order to improve security in a computing environment). Alternatively, the notification may be generated and sent when the owner has taken action towards ceasing use of the old secret, for example for implementations in which parallel secrets for accessing a given resource are not supported such that the old secret must be rotated out before the new secret is rotated in.

Figure 8:
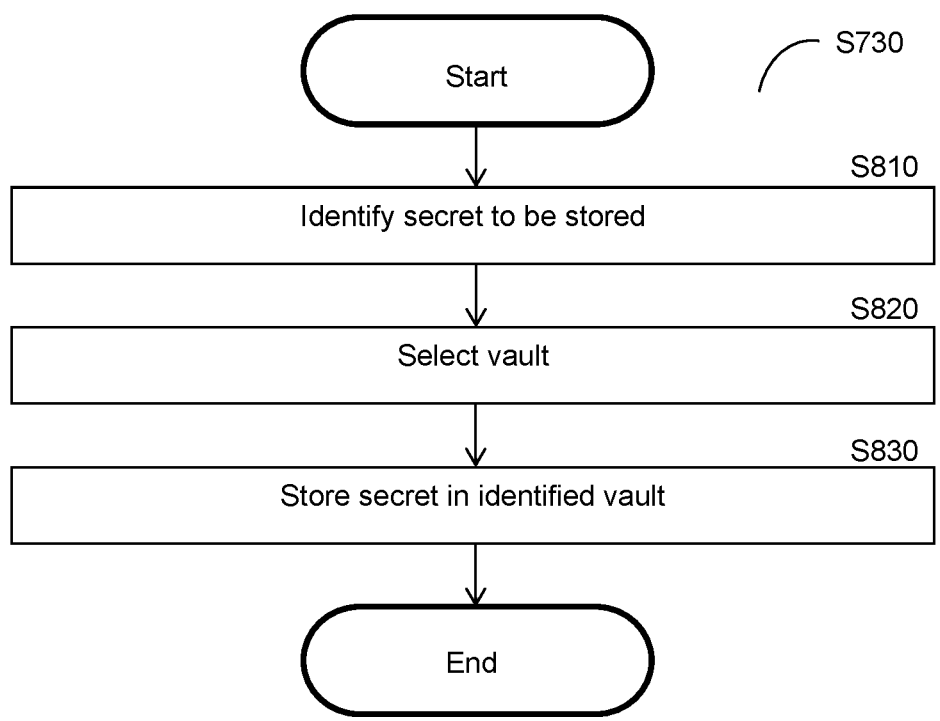
FIG. 8 is a flowchart illustrating a method for storing secrets in secret vaults according to an embodiment.

FIG. 8 is a flowchart S730 illustrating a method for storing secrets in vaults according to an embodiment.

At S810, a secret to be stored is identified. In an embodiment, the secret is a new secret to be rotated in as discussed above.

At S820, a vault in which the secret will be stored is selected. The selected vault is a data store containing at least secrets used to access respective resources.

In an embodiment, the selected vault is a vault which contains or previously contained an old secret which is to be replaced with the new secret during a secret rotation. In other words, the selected vault may be a vault of an old secret to be rotated out. In a further embodiment, the selected vault is identified based on connections between the old secret and an owner of the new secret (e.g., the owner identified as described above with respect to S710).

In yet a further embodiment, the vault is identified based on a link established between the owner of the new secret and a secret vault, for example, as described above with respect to S530. Alternatively, the vault may be selected based on user inputs, for example, inputs provided by a user who manages the owner of the secret (e.g., a user who manages an application which uses the secret to access one or more resources).

At S830, the secret is stored in the vault. In an embodiment, the secret is stored in the vault using a secret manager integrated as described above with respect to S510.

Figure 9:
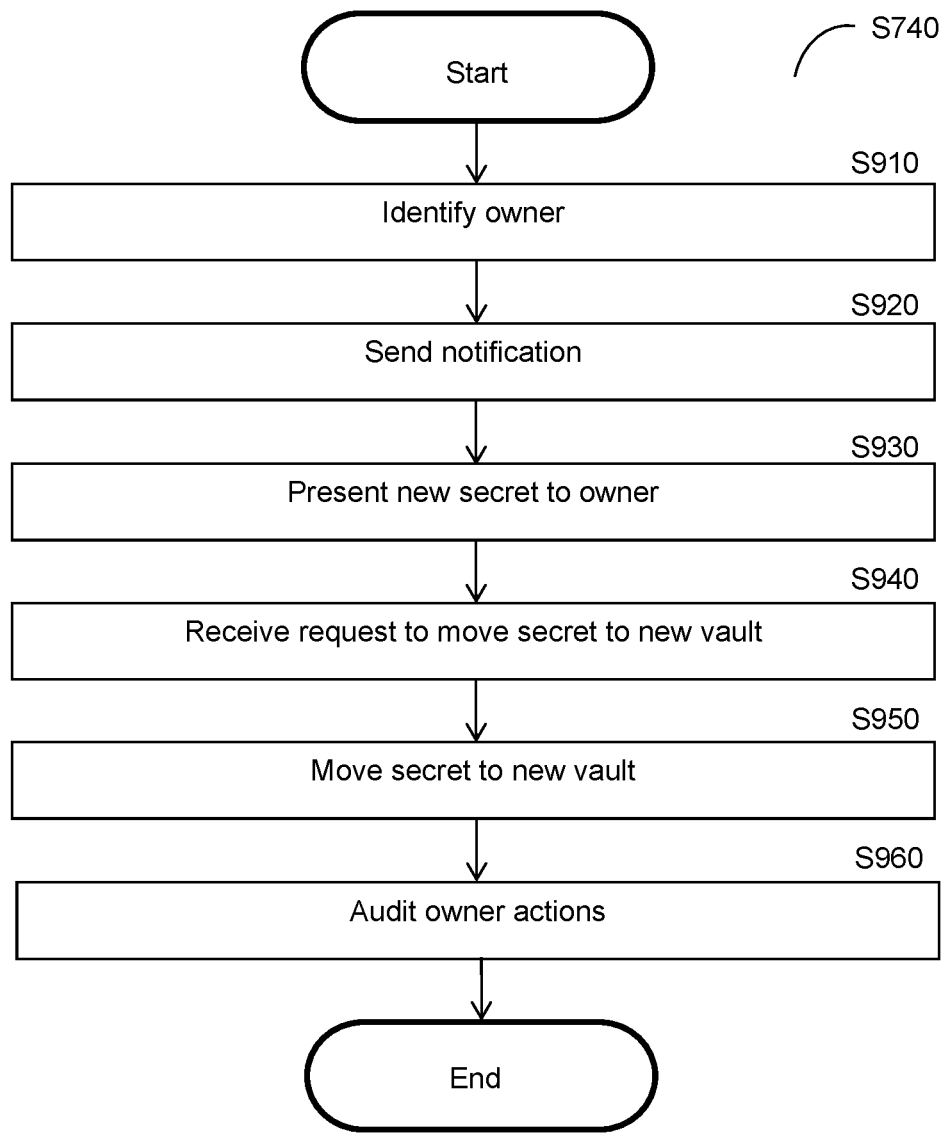
FIG. 9 is a flowchart illustrating a method for notifying an owner of a new secret according to an embodiment.

FIG. 9 is a flowchart S740 illustrating a method for notifying an owner of a new secret according to an embodiment.

At S910, an owner is identified. The owner is a user, machine, or other entity selected to be assigned ownership for a secret (e.g., the new secret rotated in during secret rotation as discussed above). The owner may be an owner of an old secret which is rotated out and replaced with the new secret. To this end, in some embodiments, S910 may include identifying the owner of the old secret as the owner to be assigned the new secret. In a further embodiment, S910 includes analyzing a graph representing connections between secrets and entities (e.g., a graph generated as discussed above with respect to S350) in order to identify a connection between the old secret and an owning entity, thereby identifying the connected owning entity as the owner to be assigned the new secret.

At S920, a notification is sent to the owner identified at S910. The notification may be sent via, for example but not limited to, email, text message, short message service (SMS) message, combinations thereof, and the like. The notification may include the new secret to be presented to the owner when the notification is opened on a user device owned or operated by the owner.

At S930, the new secret is presented to the owner. In an embodiment, S930 includes displaying the new secret to the owner via, for example, a user device operated by the owner. Upon viewing the new secret, the owner may manually rotate the secret, or may request to move the secret to a new vault such that the secret can be rotated automatically using one or more of the rotation techniques discussed above.

At optional S940, a request to move the secret to a new vault is received. The request may indicate the vault to which the secret should be moved.

At optional S950, when a request to move the secret is received at S940, the secret is moved to a new vault. When the secret has been moved to the new vault, the secret may be rotated as discussed above. Alternatively, the owner may manually rotate the secret.

At S960, actions of the new owner with respect to the secret are audited. Specifically, the actions are audited with respect to how the secret is used by the new owner. To this end, the auditing may be performed with respect to logs of a secret manager which manages a secret vault in which the secret is stored in order to identify uses of the new secret. Such auditing may be utilized to verify rotation in of the new secret as part of determining that rotation is successful as described herein.

Figure 10:
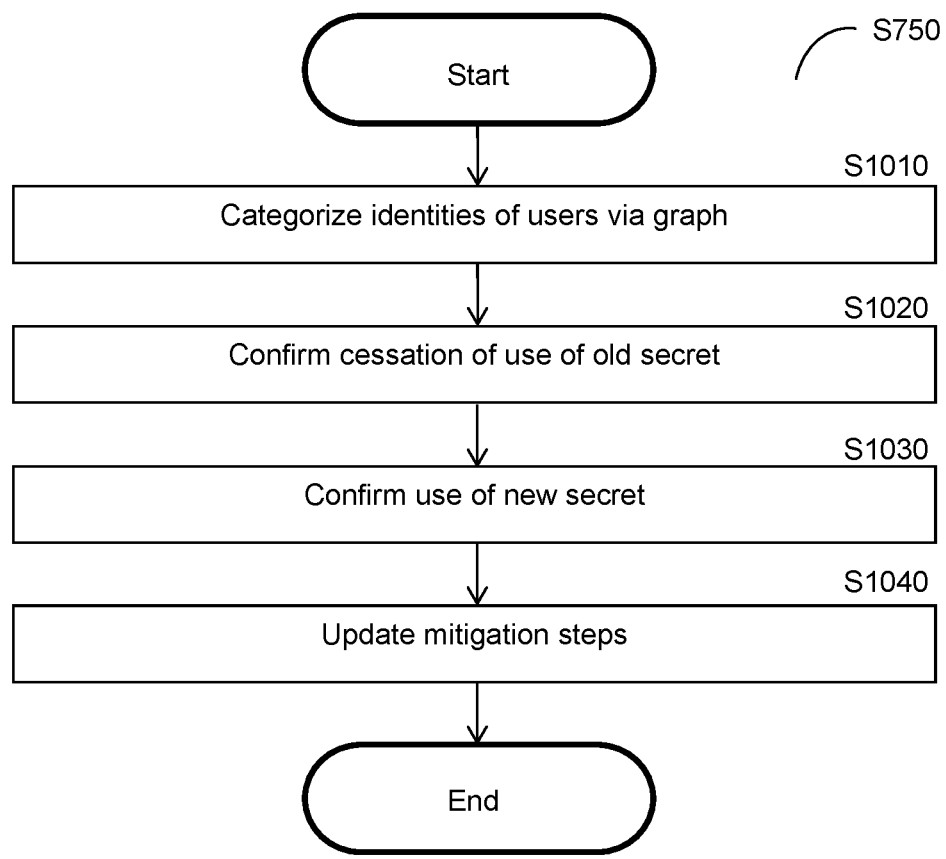
FIG. 10 is a flowchart illustrating a method for verifying rotation success according to an embodiment.

FIG. 10 is a flowchart S750 illustrating a method for verifying rotation success according to an embodiment.

At S1010, identities of consumers of an old secret to be rotated out are categorized based on a graph (e.g., the graph generated as discussed above with respect to S350). The consumers of the old secret are entities which utilize the old secret to authentication in order to access one or more resources. More specifically, by analyzing the graph before secret rotation, consumers using the old secret may be identified and categorized. In some embodiments, the consumers are categorized based on address (e.g., Internet Protocol [IP] address), user agent, time (e.g., times of use of the old secret), session identifiers, actions taken, combinations thereof, and the like.

The categorization of the users may be utilized to distinguish consumers in order to confirm that each user ceases using the old secret and begins using a new secret. That is, the categorizations may be performed so as to uniquely identify each consumers in a manner that allows for identifying subsequent uses of secrets by each user.

At S1020, cessation of use of an old secret is confirmed. As noted above, consumers are categorized so as to uniquely identify the consumers. Accordingly, S1020 includes analyzing data indicating use of secrets (e.g., logs of one or more secret managers) in order to confirm that each of the consumers has ceased using the old secret. In an embodiment, it is determined that a consumer has ceased using the old secret when at least a predetermined period of time has passed since the last instance in which the consumer used the old secret (e.g., to authenticate).

At S1030, use of a new secret is confirmed. More specifically, the data indicating use of secrets is analyzed in order to determine that a new secret is used by each of the consumers.

The analyses of data indicating secrets use performed at S1020, S1030, or both, may be performed periodically. In other words, it may be checked whether the predetermined period of time has passed since a last instance of using the old secret by each consumer periodically by analyzing a portion of the data indicating secret use generated or otherwise obtained since a last iteration of analysis. Likewise, it may be checked if each consumer has used the new secret periodically by analyzing a portion of the data indicating secret use generated or otherwise obtained since a last iteration of analysis.

In an embodiment, if either cessation of use of the old secret or use of the new secret is not confirmed within a predetermined period of time or number of iterations of analysis for any of the consumers, then the secret rotation is not verified or is otherwise determined to be unsuccessful.

At S1040, mitigation steps are updated. More specifically, mitigation actions to be performed in a computing environment are updated to be or include a mitigation action for disabling the old secret, thereby enabling disabling of the old secret.

Figure 11:
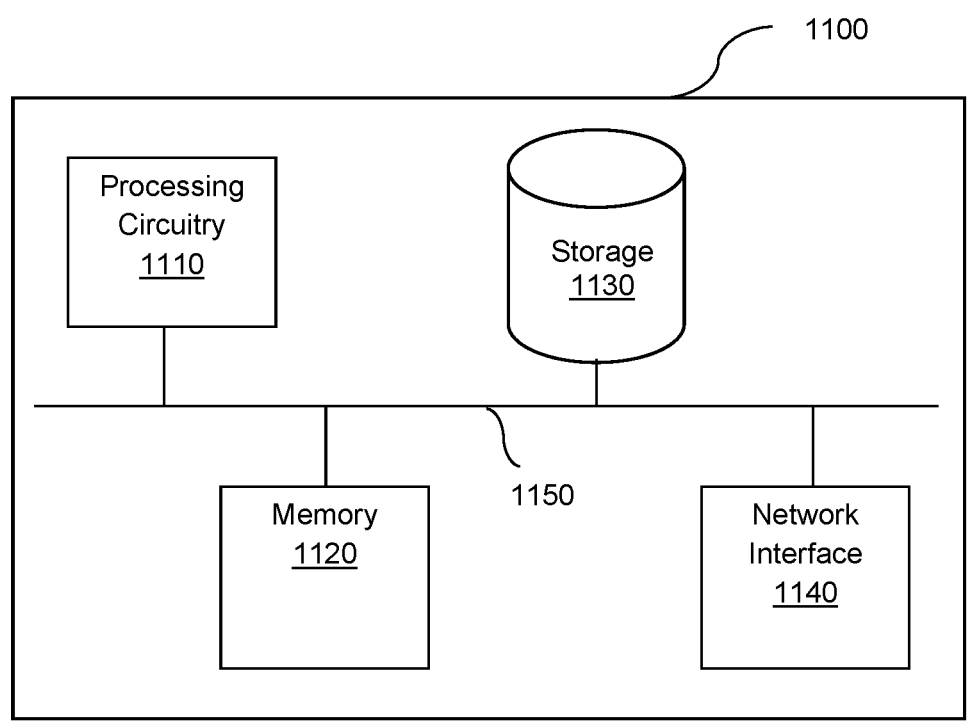
FIG. 11 is a schematic diagram of a hardware layer which may be utilized to realize at least a portion of the disclosed embodiments.

FIG. 11 is a schematic diagram of a hardware layer 1100 which may be utilized to realize at least a portion of the disclosed embodiments. The hardware layer 1100 includes a processing circuitry 1110 coupled to a memory 1120, a storage 1130, and a network interface 1140. In an embodiment, the components of the hardware layer 1100 may be communicatively connected via a bus 1150.

The processing circuitry 1110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1120 may be volatile (e.g., random access memory, etc.), non-volatile (e.g., read only memory, flash memory, etc.), or a combination thereof.

In one configuration, software for implementing one or more embodiments disclosed herein may be stored in the storage 1130. In another configuration, the memory 1120 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1110, cause the processing circuitry 1110 to perform the various processes described herein.

The storage 1130 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the hardware layer 600 to communicate with, for example, the computing environment 120, the identities database 135, the contextual data sources 140, combinations thereof, and the like.

It should be understood that the embodiments described herein are not limited to the specific architecture illustrated in FIG. 11, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for secret rotation, comprising:
    rotating a first secret by switching a second secret with the first secret;
    verifying cessation of use of the first secret by at least one entity based on secrets use with respect to a plurality of identity objects, wherein each identity object corresponds to an identity utilized in a computing environment;
    verifying use of the second secret by the at least one entity based on the secrets use with respect to the plurality of identity objects; and
    disabling the first secret when the cessation of use of the first secret and the use of the second secret have been verified;
    analyzing a graph based on data indicating the secrets use in order to identify the first secret and the second secret in the graph, wherein the cessation of the first secret and the use of the second secret are verified based further on the identification of the first secret and the second secret in the graph;
extracting a plurality of features from data of a plurality of computing service providers, wherein each extracted feature is common to at least two of the plurality of identity objects; and
assigning metadata to each of the plurality of identity objects based on the extracted features, wherein the graph includes the plurality of identity objects and assigned metadata
linking the plurality of identity objects and assigned metadata to nodes representing respective owners in the graph;
identifying an owner of the first secret based on the linking of the plurality of identity objects and assigned metadata to the nodes representing respective owners in the graph.

2. The method of claim 1, further comprising:
identifying use of the first secret by each of the at least one entity based on the identification of the first secret in the graph.

3. The method of claim 1, wherein each of the first secret and the second secret is attached to a respective identity object of the plurality of identity objects in the graph.

4. The method of claim 1, further comprising:
sending a notification indicating the rotation of the first secret to the identified owner of the first secret.

5. The method of claim 4, further comprising:
sending a notification indicating the second secret to the identified owner of the first secret.

6. The method of claim 1, further comprising:
linking at least one identity object of the plurality of identity objects to a secrets vault; and
storing the second secret in the secrets vault, wherein the use of the second secret is verified based on the at least one identity object linked to the secrets vault.

7. The method of claim 6, further comprising:
identifying the secrets vault based on the at least one identity object linked to the secrets vault, wherein the second secret is stored in the secrets vault when the secrets vault is identified.

8. A non-transitory computer readable medium having stored thereon instructions for causing a processing circuitry to execute a process, the process comprising:
rotating a first secret by switching a second secret with the first secret;
verifying cessation of use of the first secret by at least one entity based on secrets use with respect to a plurality of identity objects, wherein each identity object corresponds to an identity utilized in a computing environment;
verifying use of the second secret by the at least one entity based on the secrets use with respect to the plurality of identity objects; and
disabling the first secret when the cessation of use of the first secret and the use of the second secret have been verified;
extracting a plurality of features from data of a plurality of computing service providers, wherein each extracted feature is common to at least two of the plurality of identity objects; and
assigning metadata to each of the plurality of identity objects based on the extracted features, wherein the graph includes the plurality of identity objects and assigned metadata
linking the plurality of identity objects and assigned metadata to nodes representing respective owners in the graph;
identifying an owner of the first secret based on the linking of the plurality of identity objects and assigned metadata to the nodes representing respective owners in the graph.

9. A system for secret rotation, comprising:
a processing circuitry; and
a memory, the memory containing instructions that, when executed by the processing circuitry, configure the system to:
rotating a first secret by switching a second secret with the first secret;
verifying cessation of use of the first secret by at least one entity based on secrets use with respect to a plurality of identity objects, wherein each identity object corresponds to an identity utilized in a computing environment;
verifying use of the second secret by the at least one entity based on the secrets use with respect to the plurality of identity objects; and
disabling the first secret when the cessation of use of the first secret and the use of the second secret have been verified;
extracting a plurality of features from data of a plurality of computing service providers, wherein each extracted feature is common to at least two of the plurality of identity objects; and
assigning metadata to each of the plurality of identity objects based on the extracted features, wherein the graph includes the plurality of identity objects and assigned metadata
linking the plurality of identity objects and assigned metadata to nodes representing respective owners in the graph;
identifying an owner of the first secret based on the linking of the plurality of identity objects and assigned metadata to the nodes representing respective owners in the graph.

10. The system of claim 9, wherein the system is further configured to:
identify use of the first secret by each of the at least one entity based on the identification of the first secret in the graph.

11. The system of claim 9, wherein each of the first secret and the second secret is attached to a respective identity object of the plurality of identity objects in the graph.

12. The system of claim 9, wherein the system is further configured to:
send a notification indicating the rotation of the first secret to the identified owner of the first secret.

13. The system of claim 12, wherein the system is further configured to:
send a notification indicating the second secret to the identified owner of the first secret.

14. The system of claim 9, wherein the system is further configured to:
link at least one identity object of the plurality of identity objects to a secrets vault; and
store the second secret in the secrets vault, wherein the use of the second secret is verified based on the at least one identity object linked to the secrets vault.

15. The system of claim 14, wherein the system is further configured to:

identify the secrets vault based on the at least one identity object linked to the secrets vault, wherein the second secret is stored in the secrets vault when the secrets vault is identified.

* * * * *